Sept. 15, 1970   N. B. LUCERO   3,528,183
PENMANSHIP TRAINING BOARD
Filed May 8, 1968   2 Sheets-Sheet 1
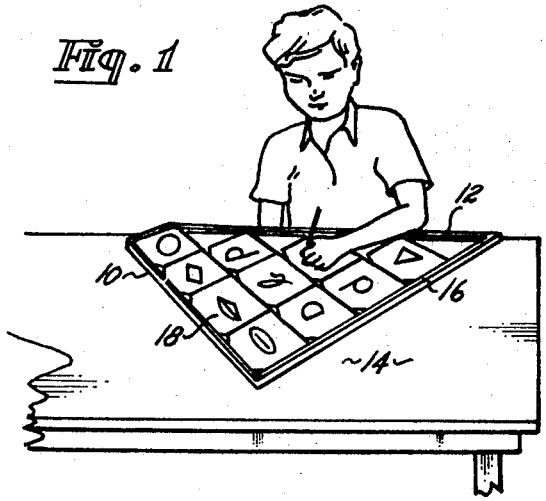
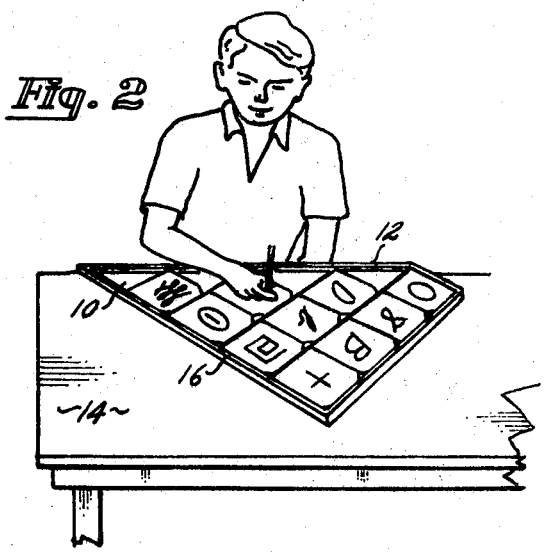
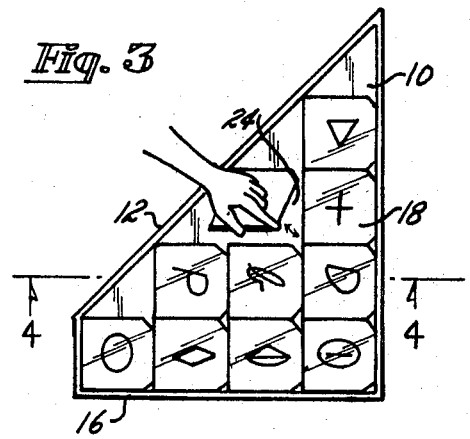
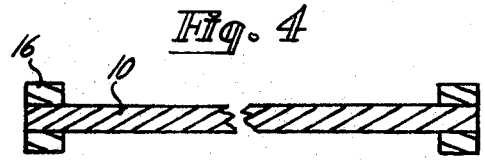
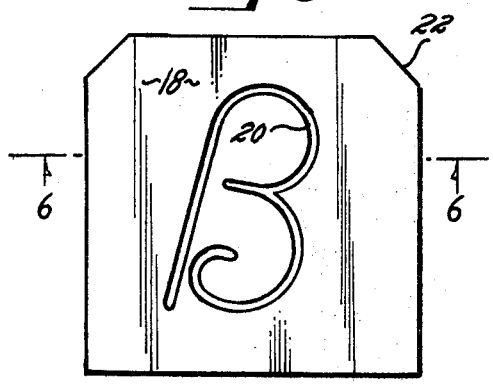
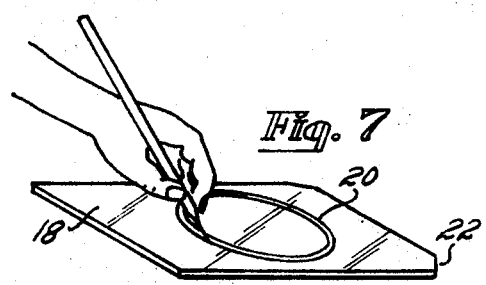
INVENTOR.
NOE B. LUCERO
BY LIONEL V. TEEFT
Attorney 3,528,183
PENMANSHIP TRAINING BOARD
Noe B. Lucero, 7453 Indiana, Riverside, Calif. 92504
Filed May 8, 1968, Ser. No. 727,628
Int. Cl. G09b 11/04
U.S. Cl. 35—37                                              5 Claims

ABSTRACT OF THE DISCLOSURE

Apparatus for teaching penmanship by continued habitual letter forming practice in grooved tiles on an arm positioning board and then transferring to free hand letter formation on the board itself.

One of the objects of the invention is to provide a specially formed grooved letter tile holding board for teaching penmanship.

Another object of the invention is to provide an arm positioning board for grooved letter practice tiles that can also be used for further free hand practice.

Yet another object of the invention is in the provision of a tile holding practice board that can be used by either right or left handed children.

Various apparatus has been provided especially by the applicant for facilitating the use of grooved letter and otherwise tiles as a means for teaching penmanship to backward children.

The fundamental theory of the present invention is to provide a specially formed grooved tile holding board that positions the child's arm and hand properly for habitual practice with the various letters and the like and then permitting hand transfer to an immediately adjacent position on the board where free hand effort may be tried. The board can be used in the nature of a chalk board as well as moved for use by either a right or left handed child.

These and other objects and advantages of the present invention will become apparent to those skilled in the art upon consideration of the following detailed description of the preferred embodiment thereof, reference being made to the accompanying drawings, herewith, wherein:

FIG. 1 is a perspective view of the device in use by a left handed child;

FIG. 2 is a perspective view of the device in inverted use by a right handed child;

FIG. 3 is a plan view of the arm and hand positioning board;

FIG. 4 is a view taken on the line 4—4 of FIG. 3;

FIG. 5 is a plan view of one of the grooved tiles;

FIG. 6 is a view taken on the line 6—6 of FIG. 5;

FIG. 7 is a perspective view of the grooved letter practicing method;

Figure 8:
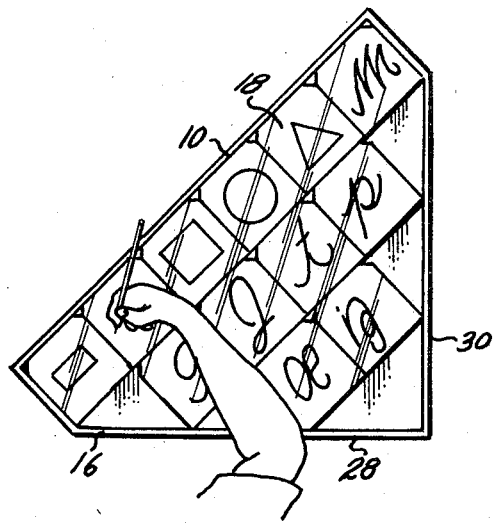
FIG. 8 is a plan view of a modified type of right and left handed board.

Referring to the drawings in which a preferred embodiment of the invention is disclosed, a grooved tile holding and chalk board has been designated 10. The board 10 is flat and one edge is cut on a diagonal 12 to fit flush with the edge of a table 14. The angle is important because when placed in the manner of FIGS. 1 and 2, the child must have his arm and hand in proper relaxed and slanted writing position. The board 10 may be inverted for right or left handed use as shown. Slightly raised edges 16 on the sides of the board 10 contain the multiple tiles 18 formed of any desired material. The tiles have grooved letters 20, numbers or any other kind of indicia desired. The tiles 18 are notched at 22 on the corners for easy removal or for inversion to expose a different letter formation on the bottom side. The tiles may be vari-colored to induce attention and for pleasure. It is desired that the board 10 be used as a chalk board as will be explained.

In this case the shape of the board forces proper writing position. Multiple tiles fit nicely on the board and the child traces the many grooved letters and the like continuously until a routine habit is acquired. In this case a tile is removed and a space 24 is left on the board so that the child after much practice can transfer his hand and chalk or the like to a free hand writing position thereon to test his or her skill.

Figure 9:
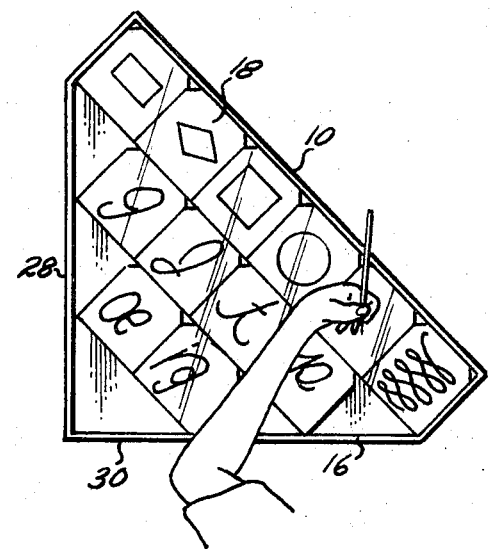
FIG. 9 is a view similar to FIG. 8 with the board moved for left handed use.
Figure 10:
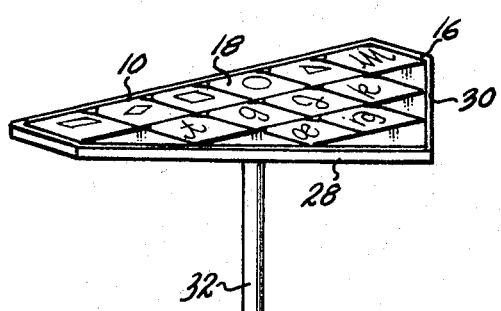
FIG. 10 is a perspective view of a pedestal type board support.
Figure 11:
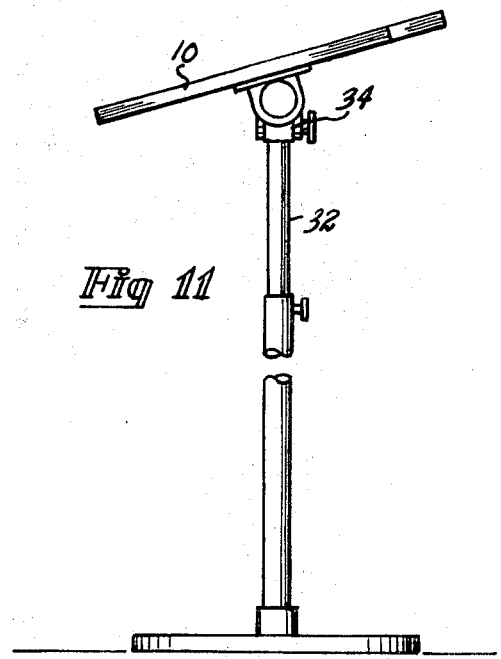
FIG. 11 is an elevational view showing the universal mounting of the board of FIGS. 8 through 10.

In FIGS. 8 through 11 the board 10 has been modified as shown at 26 wherein the dual angled sides 28 and 30 permit movement thereof from right to left handed use, FIGS. 8 and 9, without inversion as previously described. The other elements of the board and tiles is exactly the same and its operation the same. It is contemplated that the board may be mounted on a pedestal 32 and have universal positioning as shown at 34.

While I have described in considerable detail what I believe to be the preferred form of my invention, it will be understood by those skilled in the art that various changes may be made in the shape and arrangement of the several parts without departing from the broad scope of my invention as defined in the following claims.

I claim:
1. A penmanship practice device, comprising:
   a chalk board having a diagonally slanted edge fitting flush with a table edge or for proper right and left handed writing position;
   upraised edges on the board; and
   a plurality of character marked tiles removably disposed on the board surface between the edges;
   whereby after the grooves in said tiles are traced until a routine habit is formed the tiles may be removed and the characters reproduced on the chalk board in a free hand effort.

2. A device as set forth in claim 1 in which the underside of the board has similar raised edges for inverted left and right hand use.

3. A device as set forth in claim 1 in which the tiles are notched at their corners for easy lift and conversion.

4. A device as set forth in claim 1 in which the board is diagonally slanted on two sides for table edge movement to right or left handed position of use.

5. A device as set forth in claim 1 in which the board has universal mounting on a pedestal.

References Cited

UNITED STATES PATENTS

| | | | |
|---|---|---|---|
| 433,725 | 8/1890 | Ewing | 35—36 |
| 3,063,164 | 11/1962 | Pellegrino et al. | 35—66 |
| 3,197,892 | 8/1965 | Hancy | 35—37 |

WILLIAM H. GRIEB, Primary Examiner

U.S. Cl. X.R.

35—61